(12) United States Patent
Izumi et al.

(10) Patent No.: US 7,274,348 B2
(45) Date of Patent: Sep. 25, 2007

(54) LIQUID CRYSTAL DISPLAY APPARATUS

(75) Inventors: Tomoo Izumi, Toyonaka (JP);
Mitsuyoshi Miyai, Ibaraki (JP); Jun Yamada, Takatsuki (JP); Masakazu Okada, Kyoto (JP); Keiichi Furukawa, Suita (JP)

(73) Assignee: Konica Minolta Holdings, Inc., Tokyo (JP)

( * ) Notice: Subject to any disclaimer, the term of this patent is extended or adjusted under 35 U.S.C. 154(b) by 672 days.

(21) Appl. No.: 10/865,217

(22) Filed: Jun. 10, 2004

(65) Prior Publication Data

US 2005/0174317 A1  Aug. 11, 2005

(30) Foreign Application Priority Data

Feb. 10, 2004  (JP) .............................. 2004-034309

(51) Int. Cl.
G09G 3/36  (2006.01)
(52) U.S. Cl. .......................... 345/87; 345/101; 349/176
(58) Field of Classification Search .................. 345/87, 345/101, 96, 76; 349/12, 35, 96, 123, 176, 349/117, 113, 72; 428/1.1
See application file for complete search history.

(56) References Cited

U.S. PATENT DOCUMENTS

| 7,064,737 B2 * | 6/2006 | Lee et al. ...................... 345/94 |
| 2001/0024188 A1 | 9/2001 | Masazumi et al. | |

FOREIGN PATENT DOCUMENTS

| JP | 2001-228459 | 8/2001 |
| WO | WO98/50804 | 11/1998 |

OTHER PUBLICATIONS

SID International Symposium Digest of Technical Paper, vol. 29, 1998, 31.1: Invited Paper: "Reflective Color Display Using Cholesteric Liquid Crystals", Hashimoto et al., Minolta Col., Ltd., Osaka, Japan, pp. 897-900.

* cited by examiner

Primary Examiner—Richard Hjerpe
Assistant Examiner—Abbas Abdulselam
(74) Attorney, Agent, or Firm—Brinks Hofer Gilson & Lione

(57) ABSTRACT

A liquid crystal display apparatus which have a circular polarizer and a liquid crystal display in a stack. The liquid crystal display has a chilral nematic liquid crystal layer between substrates, and on the mutually opposite sides of the substrates, electrodes and aligning layers are formed. The liquid crystal switches between a planar alignment state and a focal-conic alignment state depending on the voltage applied thereto through the electrodes. In a planar state, light reflected by the electrodes is absorbed by the circular polarizer, and a black display is made. In a focal-conic state, light reflected by the electrodes passes through the circular polarizer, and a white display is made. The liquid crystal is driven by a chain of voltage pulses including a reset step of resetting the liquid crystal to a homeotropic state, a selection step of selecting the alignment state of the liquid crystal under zero-volt application and an evolution step of causing the liquid crystal to evolve to the selected alignment state.

15 Claims, 8 Drawing Sheets

F I G. 1a
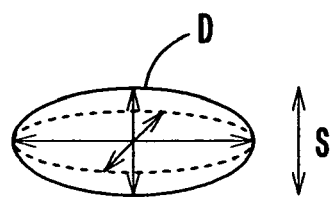
F I G. 1b
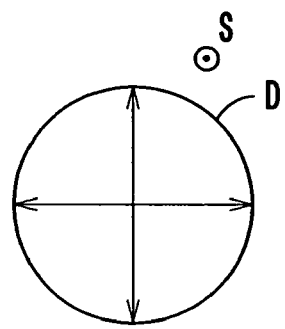
F I G. 1c
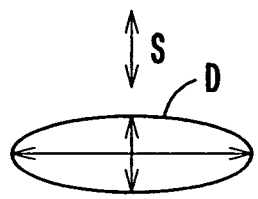
F I G. 2
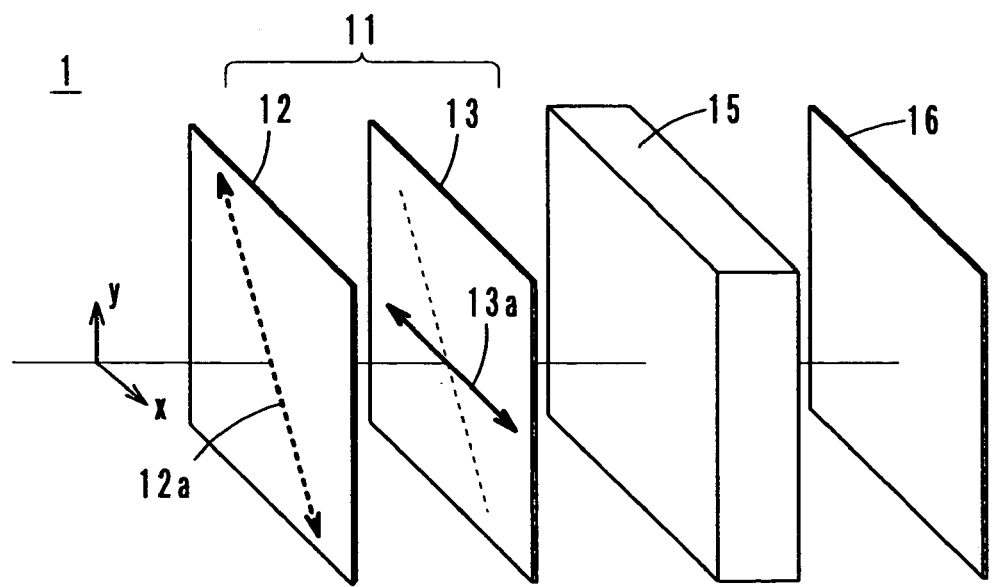

LIQUID CRYSTAL DISPLAY APPARATUS

This application is based on Japanese patent application No. 2004-34309 filed on Feb. 10, 2004, the content of which is hereby incorporated by reference.

BACKGROUND OF THE INVENTION

1. Field of the Invention

The present invention relates to a liquid crystal display apparatus, and more particularly to a liquid crystal display apparatus which uses cholesteric liquid crystal as a display medium.

2. Description of Related Art

In recent years, reflective type liquid crystal displays are studied and developed into displays of mobile telephones and portable personal computers. Reflective type liquid crystal displays make displays by reflecting external light and therefore are advantageous of being power-saving, of being thin and light, etc.

In reflective type liquid crystal displays, generally, nematic liquid crystal is used, and these liquid crystal displays are operated typically in a TN (twisted nematic) mode and in an STN (super twisted nematic) mode. The nematic liquid crystal does not have a memory effect, and the liquid crystal displays consume power while displaying information on the liquid crystal (although the reflective type liquid crystal displays consume less power than transmitting type liquid crystal displays which use back lights).

In the meantime, lately, reflective type liquid crystal displays with a memory effect have been developed because this type of liquid crystal displays are expected to contribute to more power saving. A typical of this type is a liquid crystal display using cholestric liquid crystal. Cholestric liquid crystal is bistable, that is, has a memory effect. Specifically, cholesteric liquid crystal turns into a planar alignment state or a focal-conic alignment state depending on the voltage applied thereto and keeps in the alignment state. The cholesteric liquid crystal has the following characteristic: when the cholesteric liquid crystal is in the planar state, the liquid crystal selectively reflects light of a specified wavelength among incident light; and when the cholesteric liquid crystal is in the focal-conic state, the liquid crystal substantially does not reflect incident light. By using this characteristic, the liquid crystal display is capable of making a display without a polarizer, and the display is bright. Such a liquid crystal display using the characteristic of cholesteric liquid crystal is disclosed by SID International Symposium Digest of Technical Paper, Volume 29, 1998, page 897.

The liquid crystal display which makes a display by using the selective reflection of cholesteric liquid crystal and without using a polarizer is driven by a method in which a chain of voltage pulses is applied to the liquid crystal, the chain of voltage pulses including three steps, namely, a reset step of resetting the liquid crystal to a homeotropic state, a selection step of selecting an alignment state in which the liquid crystal will finally stay under zero-volt application, and an evolution step of causing the liquid crystal to evolve to the selected alignment state. This driving method is disclosed by International Publication No. WO98/50804 and Japanese Patent Laid-Open Publication No. 2001-228459. The driving method in which a chain of voltage pulses including the three steps is applied has the advantage that the pulse width applied in the selection step is short, resulting in high-speed driving.

When the liquid crystal display without using a polarizer is driven by the three-step driving method, from the start of the reset step to the end of the evolution step, however, the liquid crystal is substantially in a state to transmit light, and a light absorbing layer provided on the back side of the display is visible to the user. This phenomenon occurs regardless of which alignment state the liquid crystal will be finally turned into. Therefore, every time the display is updated; the screen becomes dark, that is, a blackout occurs before a new picture appears, which gives the user an unpleasant feeling.

SUMMARY OF THE INVENTION

An object of the present invention is to provide a liquid crystal display apparatus having cholesteric liquid crystal as a display medium, wherein high-speed driving is possible and blackouts hardly occur.

In order to attain the object, a liquid crystal display apparatus according to the present invention comprises: a cholesteric liquid crystal layer which switches between a planar alignment state and a focal-conic alignment state depending on a voltage applied thereto; a polarizer which is located by an observing side of the cholesteric liquid crystal layer; and a driving section which outputs a chain of voltage pulses including a reset step of resetting the cholesteric liquid crystal to a homeotropic state, a selection step of selecting an alignment state of the liquid crystal under zero-volt application and an evolution step of causing the liquid crystal to evolve to the selected alignment state.

According to the present invention, a polarizer is added to a liquid crystal display which has cholesteric liquid crystal and which is driven by a three-step driving wave including a reset-step, a selection step and an evolution step such that the polarizer is located by an observing side of the liquid crystal display, and this liquid crystal display apparatus is driven based on a displaying principle which is different from the principle which is used for driving a conventional liquid crystal display apparatus which does not comprise a polarizer and uses selective reflection of cholesteric liquid crystal. The liquid crystal display according to the present invention, unlike the liquid crystal display without a polarizer, makes a dark (black) display when the liquid crystal is in a planar alignment state and makes a bright (white) display when the liquid crystal is in a focal-conic alignment state. During a writing time from the start of a reset step to the end of an evolution step, when the liquid crystal is selected to become a planar alignment state, the liquid crystal substantially keeps in a homeotropic state, and when the liquid crystal is selected to become a focal-conic alignment state, the liquid crystal substantially turns to a focal-conic state gradually. Therefore, there is no possibility that the liquid crystal is in a blackout state during the writing time. In other words, at least from the middle of the writing-time, the display of the liquid crystal is almost compatible with the display after the writing. Thus, according to the present invention, while the advantage of high-speed driving is kept, the problem of a blackout during a writing time can be solved.

According to the present invention, by further stacking a reflector, the liquid crystal display apparatus can be made a reflective type, and the reflective type liquid crystal display apparatus has the advantage of consuming less power.

In the reflective type liquid crystal display apparatus, when the circumstantial temperature is at least 25° C., by applying a voltage substantially within a range from 30V to 45V or substantially within a range from 10.7 d(V) to 12.7 d(V) to the liquid crystal in the reset step, wherein d is the thickness (μm) of the liquid crystal layer, the following advantages can be further obtained as well as inhibition of blackouts and high-speed driving: a reduction in power consumption for writing without causing a bad-conditioned display; a reduction in cost of a power source; and an improvement in process yield of the liquid crystal display.

Also, in the reflective type liquid crystal display apparatus, when the circumstantial temperature is at least 25° C., by applying a voltage substantially higher than 45V or substantially higher than 12.7 d(V) to the liquid crystal in the reset step, wherein d is the thickness (μm) of the liquid crystal layer, an improvement in contrast can be attained as well as inhibition of blackouts and high-speed driving.

In the reflective type liquid crystal display apparatus, when the circumstantial temperature is at least 25° C., by applying a voltage substantially within a range from 20V to 30V or substantially within a range from 7.2 d(V) to 9.7 d(V) to the liquid crystal in the evolution step, wherein d is the thickness (μm) of the liquid crystal layer, the following advantages can be further obtained as well as inhibition of blackouts and high-speed driving: a reduction in power consumption for writing without causing a bad-conditioned display; a reduction in cost of a power source; and an improvement in process yield of the liquid crystal display.

In the reflective type liquid crystal display apparatus, also, when the circumstantial temperature is at least 25° C., by applying a voltage substantially higher than 12.7 d(V) to the liquid crystal in the reset step and applying a voltage substantially within a range from 7.2 d(V) to 9.7 d(V) to the liquid crystal in the evolution step, wherein d is the thickness (μm) of the liquid crystal layer, an improvement in contrast can be attained as well as inhibition of blackouts and high-speed driving.

According to the present invention, also, by further providing a second polarizer and a light source in the rear side of the liquid crystal layer, the liquid crystal display apparatus can be made a transmitting type.

The liquid crystal display apparatus according to the present invention further comprises scanning electrodes and signal electrodes which face each other with the liquid crystal layer in-between, and the driving section comprises a scanning electrode driving circuit for applying a reset pulse in the reset step, a selection pulse in the selection step and an evolution pulse in the evolution step to the scanning electrodes, and a signal electrode driving circuit for applying a signal pulse, which is of a voltage lower than a threshold to cause crosstalk in the selection step, to the signal electrodes. With this arrangement, a high-accuracy display apparatus can be obtained easily at low cost. In this case, by keeping a constant value regardless of the circumstantial temperature as at least the voltage of the reset pulse applied to the scanning electrodes or as at least the voltage of the evolution pulse applied to the scanning electrodes driving control becomes easy, and simplification of the driving circuits becomes possible.

BRIEF DESCRIPTION OF THE DRAWINGS

This and other objects and features of the present invention will be apparent from the following description with reference to the accompanying drawings in which:

FIGS. 1a, 1b and 1c are schematic views which show changes of the alignment state of liquid crystal which is used in a liquid crystal display apparatus according to the present invention;

FIG. 2 is a perspective view of a general structure of the liquid crystal display apparatus;

DETAILED DESCRIPTION OF THE PREFERRED EMBODIMENTS

Figure 3:
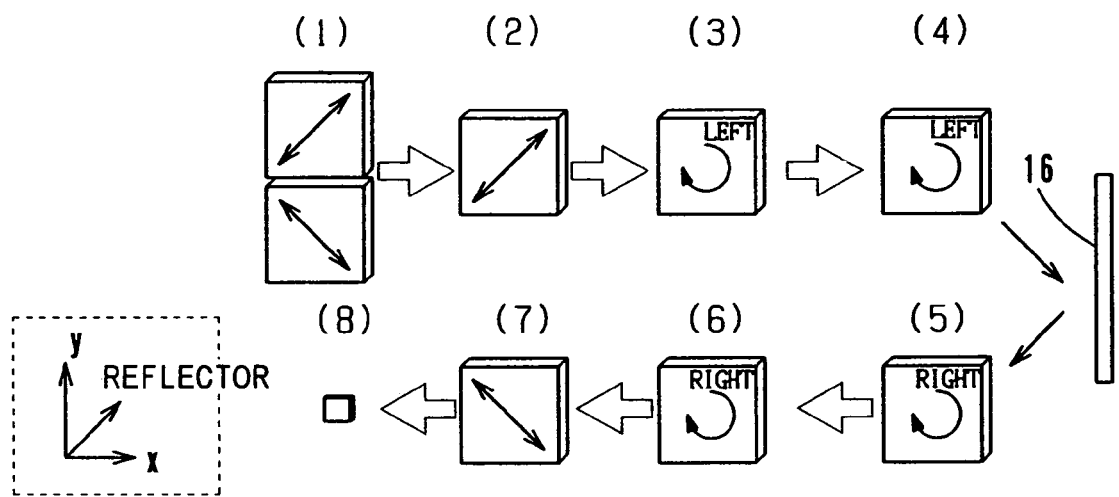
FIG. 3 is an illustration which shows the display principle (planar alignment) of the liquid crystal display apparatus.

Embodiments of a reflective type liquid crystal display apparatus according to the present invention are described with reference to the accompanying drawings.

Optical Anisotropy of Chiral Nematic Liquid Crystal; See FIG. 1

A typical of nematic liquid crystal which exhibits a cholesteric phase at room temperature is chiral nematic liquid crystal which can be produced by adding a sufficient amount of chiral agent to nematic liquid crystal to cause the nematic liquid crystal to exhibit a cholesteric phase.

A chiral agent is a dopant which, when it is added to nematic liquid crystal, twists the nematic liquid crystal molecules. By adding a chiral agent to nematic liquid crystal, the liquid crystal molecules form a helical structure, and thereby, the liquid crystal composition exhibits a cholesteric phase.

Chiral nematic liquid crystal of this kind exists in a plurality of domains between substrates supporting this chiral nematic liquid crystal. Referring to FIG. 1, the helical axes S of liquid crystal molecules in a domain D are uniform. The domain D of the chiral nematic liquid crystal can be regarded to be a refractive oval substance with optical anisotropy.

When the liquid crystal is in a planar alignment state as shown by FIG. 1b, that is, when the helical axes S of the liquid crystal molecules are in perpendicular to the substrates, the refractive index on the plane of the substrates is isotropic. When the liquid crystal is in a focal-conic alignment state as shown in FIG. 1c, that is, when the helical axes S of the liquid crystal molecules are in parallel to the substrates, the refractive index on the plane of the substrates is non-isotropic. Thus, in accordance with the alignment state of the liquid crystal molecules, the refractive index changes.

When the liquid crystal is isotropic in refractive index (in a planar alignment state), if a polarized light which is not selectively reflected by the liquid crystal in a planar alignment state is incident to the domain D, the domain D transmits the incident light. When the liquid crystal is anisotropic in refractive index (in a focal-conic alignment state), the polarization of an incident light changes due to birefringence. By using these phenomena, it is possible to make a monochromatic display.

General Structure and Display Principle; See FIGS. 2-4

First, a reflective type liquid crystal display apparatus is described as an example.

As FIG. 2 shows, a liquid crystal-display 1 according to the present invention comprises a circular polarizer 11, a liquid crystal display 15 and a reflector 16 which are stacked in this order from the observing side. The circular polarizer 11 is composed of a linear polarizer 12 with an absorbing axis 12a and a quarter wavelength retardation film 13 with a lagging axis 13a.

The liquid crystal display 15 has chiral nematic liquid crystal between two substrates which have electrodes on mutually opposite sides. The chiral nematic liquid crystal meets the condition $\Delta nd=(1/4)\lambda$ when the liquid crystal is in a focal-conic alignment state. The value $\Delta nd$ indicates retardation, and the unit is nanometer (nm). $\Delta n$ is anisotropy of refractive index, and d is a gap between the substrates. The reflector 16 is to reflect light which has passed through the liquid crystal layer and is made of aluminum, silver or the like.

Figure 4:
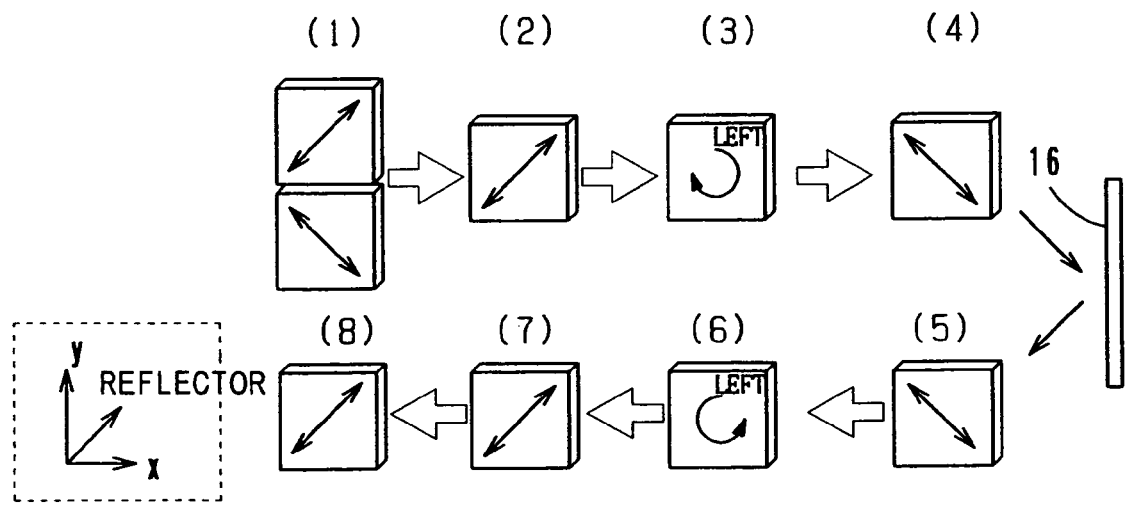
FIG. 4 is an illustration which shows the display principle (focal-conic alignment) of the liquid crystal display apparatus.

Fifty percent of light which is incident to the circular polarizer 11 (composed of a linear polarizer 12 and a retardation film 13) is absorbed in the circular polarizer 11, and the remaining fifty percent is circularly polarized (polarized clockwise or counterclockwise) and passes through the circular polarizer 11 (see (1) and (2) of FIGS. 3 and 4).

When the circularly polarized light is incident to a domain of the chiral nematic liquid crystal, if the domain of the liquid crystal is in a planar alignment state, the circularly polarized light passes through the liquid crystal layer without changing its polarization state (see (3) and (4) of FIG. 3). The circular polarized light which has passed through the liquid crystal layer is reflected by the reflector 16. In this moment, because the traveling direction of the circularly polarized light reverses, the direction of circular polarization of the light becomes opposite (see (5) of FIG. 3).

The reflected light passes through the liquid crystal layer (see (6) of FIG. 3) and is incident to the circular polarizer 11 again. The direction of circular polarization of this incident light is opposite, and therefore, the light is absorbed in the circular polarizer 11 (see (7) and (8) of FIG. 3). Consequently, in this moment, a black display is seen.

On the other hand, when the circularly polarized light which has passed through the circular polarizer 11 is incident to a domain in a focal-conic alignment state, the circularly polarized light changes into linearly polarized light due to retardation (phase difference) of $\frac{1}{4}\lambda$ caused by birefringence while passing through the liquid crystal layer (see (3) and (4) of FIG. 4). The linearly polarized light which has been emergent from the liquid crystal layer is reflected by the reflector 16, and the linearly polarized light changes back into circular polarized light due to retardation of $\frac{1}{4}\lambda$ caused by birefringence while passing through the liquid crystal layer (see (5) and (6) of FIG. 4). This circular polarized light passes through the circular polarizer 11 without changing its polarization state (see (7) and (8) of FIG. 4), and consequently, a white display is seen.

FIGS. 3 and 4 schematically show the changes of the state of light, and the numbers (1) through (8) show the states of light in the following moments; (1) before being incident to the circular polarizer; (2) immediately after passing through the linear polarizer; (3) immediately after passing through the retardation film; (4) immediately after passing through the liquid crystal layer; (5) immediately after being reflected by the reflector; (6) immediately after passing through the liquid crystal layer again; (7) immediately after passing through the retardation film again; and (8) immediately after passing through the linear polarizer.

First Embodiment; See FIG. 5

Figure 5:
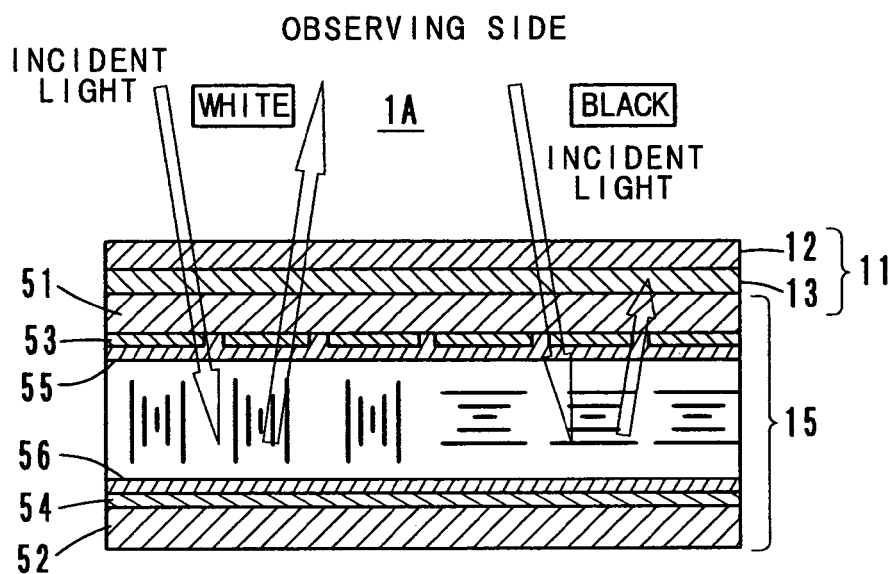
FIG. 5 is a sectional view of a reflective type liquid crystal display apparatus according to a first embodiment of the present invention.

As FIG. 5 shows, a liquid crystal display apparatus 1A according to a first embodiment of the present invention comprises a circular polarizer 11 (composed of a linear polarizer 12 and a retardation film 13) and a liquid crystal display 15 which are stacked in this order from an observing side.

The liquid crystal display 15 has chiral nematic liquid crystal between substrates 51 and 52. The substrate 51 by the side of the observing surface is made of a transparent material with a high transmittance, and the substrate 52 on the back may be transparent or opaque. As the material of the substrates 51 and 52, a thin glass plate and a film of resin, such as polyether sulfone (PES), polycarbonate (PC), polyethylene terephthalate (PET), etc., are usable. On the mutually opposite sides of the substrates 51 and 52, electrodes 53 and 54 and aligning layers 55 and 56 are formed. In addition to the aligning layers 55 and 56, insulating layers may be formed. Although the aligning layers 55 and 56 are not indispensable in view of the driving principle of the liquid crystal display 15, it is preferred for stability of the liquid crystal display 15 that the aligning layers 55 and 56 are provided.

The electrodes 53 on the substrates 51 are transparent electrodes made of ITO, IZO or the like. The electrodes 54 on the substrate 52 may be transparent or opaque, but at least the surfaces of the electrodes 54 are metallic so that the electrodes 54 will serve as a reflector. More specifically, if the electrodes 54 are made of a transparent material, aluminum or silver is coated on the surfaces of the electrodes 54 so as to give a reflecting function to the electrodes 54. Alternately, the electrodes 54 may be made of aluminum or silver so that the electrodes 54 will also function as a reflector.

Also, the substrate 52 which is located farther from the observing side may be transparent, and a reflector may be provided on the back side of the substrate 52. In this case, however, it is necessary to make the substrate 52 as thin as possible so that the distance between the liquid crystal layer and the reflector will be as short as possible.

Figure 8:
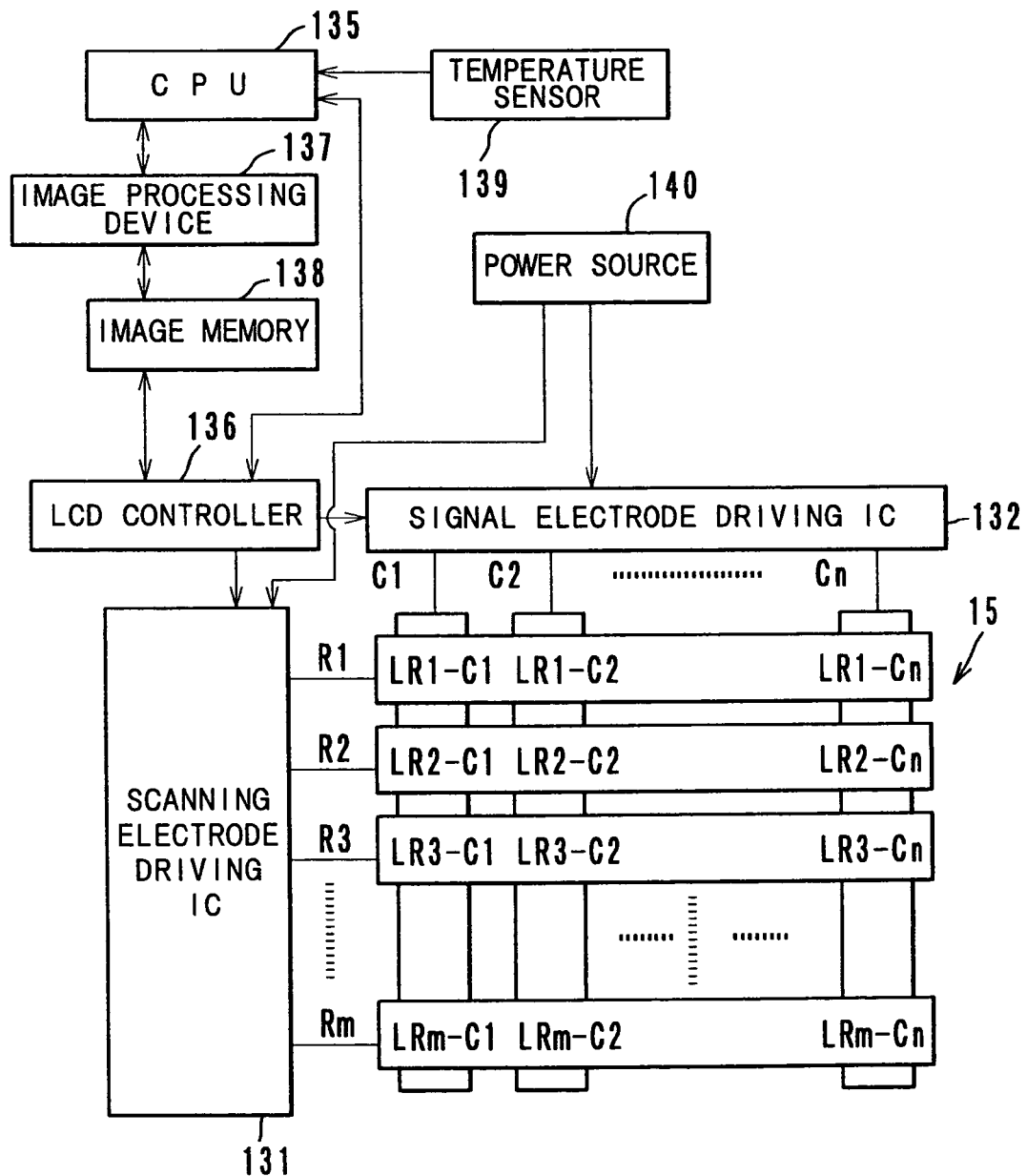
FIG. 8 is a block diagram of a driving circuit usable for the liquid crystal display apparatuses.

The electrodes 53 and 54 are connected to a scanning electrode driving IC 131 and a signal electrode driving IC 132, respectively as shown in FIG. 8, and specified pulse voltages are applied to the electrodes 53 and 54. In accordance with the voltages applied to the electrodes 53 and 54, the chiral nematic liquid crystal becomes a planar state or a focal-conic state, and thereby, the display state changes. This liquid crystal, whether it is in a planar state or in a focal-conic state, keeps the alignment state after the application of voltages is stopped, that is, this liquid crystal has bistability (memory effect).

The electrodes 53 are a plurality of electrode strips which are in parallel to one another at fine intervals, and likewise, the electrodes 54 are a plurality of electrode strips which are in parallel to one another at fine intervals. The extending direction of the electrodes 53 and the extending direction of the electrodes 54 are perpendicular to each other viewed from the observing side. Pulse voltages are applied to these upper and lower electrode strips successively. This is referred to as matrix driving, and the intersections of the electrodes 53 and 54 function as pixels.

For the liquid crystal display 15, liquid crystal which exhibits a cholesteric phase is preferably used, and especially chiral nematic liquid crystal, which is produced by adding a chiral agent to nematic liquid crystal by an amount sufficient to cause the liquid crystal to exhibit a cholesteric phase, is suited. If the cholestric liquid crystal has too long a helical pitch, the liquid crystal will not have good bistability. In order to have good bistability, the liquid crystal preferably has a helical pitch not more than 1000 nm.

As the nematic liquid crystal, known kinds, such as biphenyl, phenylcyclohexyl, tarphenyl, tolane, pyrimidine, stilbene, etc., are usable. As the chiral agent, known kinds comprising an optically activating radical, such as a cholesterol ring, such as an ester compound, a pyrimidine compound, an azoxy compound, a tolane compound, etc., are usable.

It is preferred that the liquid crystal layer is so fixed that the retardation ($\Delta nd$) which occurs when the liquid crystal is in a focal-conic state will be a quarter of the wavelength of light. If the circular polarizer is ideal and perfect, the reflectance R of the liquid crystal display in a focal-conic state is calculated by the following expression.

$$R=(\tfrac{1}{2})\{\sin^2(2\pi\Delta nd/\lambda)\}$$

$\Delta n$: anisotropy of refractive index in a focal-conic state
d: thickness of the liquid crystal layer In order to attain a good monochromatic display, the peak of the reflectance R is preferably within the visible spectrum (from 400 nm to 700 nm). In other words, the retardation $\Delta nd$ is preferably within a range from 100 nm to 175 nm which is a quarter of $\lambda$=400 nm to 700 nm. Especially in order to attain a good white display (to attain a flat spectral reflectance characteristic within the visible spectrum), the retardation $\Delta nd$ is 135±10 nm.

It is preferred that the liquid crystal display 15 is designed to have a value $\Delta nd$ which is a little larger than 135±10 nm. This is because the helical axis of the liquid crystal in a focal-conic alignment state is not perfectly at 0 degree (parallel) to the substrates. In order to compensate the reduced retardation due to the fact that the helical axis of the liquid crystal in a focal-conic state is not 0 degree, preferably, the value $\Delta nd$ of the liquid crystal display 15 is a little larger, and specifically, 160±20 nm, desirably 160±115 nm and more desirably 160±10 nm.

For example, in order to design the liquid crystal display 15 to have $\Delta nd$ of 160±10 nm, the liquid crystal layer should have either of the following combinations of, $\Delta n$ (anisotropy of refractive index in a focal-conic state) and d (thickness):

$\Delta nd$=160 nm=0.0320($\Delta n$)×5.0 μm(d)

$\Delta nd$=160 nm=0.0400($\Delta n$)×4.0 μm(d)

$\Delta nd$=160 nm=0.0457($\Delta n$)×3.5 μm(d)

$\Delta nd$=160 nm=0.0533($\Delta n$)×3.0 μm(d)

Meanwhile, in order to achieve a good black display, the helical axis of the liquid crystal in a planar alignment state are preferably at 90 degrees to the substrates (retardation $\Delta nd$=0 nm). However, the helical axis of the liquid crystal in a planar state actually tilts a little and is not perfectly at 90 degrees. The degree of the tilt also depends on the thickness d of the liquid crystal layer. According to the results of experiments conducted by the present inventors, as the thickness d of the liquid crystal layer becomes smaller, the tilt of the helical axis of the liquid crystal in a planar state becomes smaller, that is, the helical axis in a planar state becomes closer to 90 degrees to the substrates. Therefore, the smaller the thickness d of the liquid crystal layer is, the better the black display is.

However, thinning the liquid crystal layer may result in having difficulty in fabricating the liquid crystal display 15. Considering both display characteristic and easiness in fabrication, the thickness d of the liquid crystal layer is desirably within a range from 2.5 μm to 4.5 μm, more desirably within a range from 2.5 μm to 4.0 μm, further more desirably within a range from 3.0 μm to 4.0 μm and further more desirably within a range from 3.0 μm to 3.5 μm.

Further, the liquid crystal layer comprises spacers of an inorganic material and/or a columnar structure (not shown) of an organic material so as to keep a gap between the substrates 51 and 52. However, the liquid crystal layer does not have to be of this structure. The liquid crystal layer may be of a conventional polymer dispersed type in which liquid crystal is dispersed in a polymeric three-dimensional net or a polymeric three-dimensional net is formed in liquid crystal.

The circular polarizer 11 is a combination of a linear polarizer 12 and a retardation film 13. The linear polarizer 12 is of a conventional type, and the retardation film 13 is a conventional quarter wavelength retardation film. The circular polarizer 11 is fabricated by laminating the linear polarizer and the retardation film such that the optical axes thereof will be at 45 degrees or 135 degrees to each other.

However, the circular polarizer of this structure is not perfect. This circular polarizer serves as a perfect circular polarizer only to light of a specified wavelength within the visible spectrum, and serves as an elliptic polarizer to visible light of the other wavelengths. In order to make the circular polarizer as perfect as possible, it is necessary to laminate a plurality of retardation films. However, the use of a large number of retardation films causes a problem of a rise in cost, and preferably, at most three retardation films are used. It is the best to achieve sufficiently good display performance while minimizing the cost by using a single retardation film.

Circular polarizers are classified into clockwise polarizers (light which passed through the polarizer is clockwise polarized light) and counterclockwise polarizer (light which passed through the polarizer is counterclockwise polarized light). In order to achieve good monochromatic display performance in a preferred embodiment of the present invention, it is preferred to use a circular polarizer which transmits light which is polarized in a direction so as not to be selectively reflected by the liquid crystal layer.

In order to make a display of white and another color, for example, to make a white-and-blue display by using selective reflection of liquid crystal also in a planar state, a circular polarizer which transmits light which is polarized in a direction so as to be selectively reflected by the liquid crystal layer should be used.

Second Embodiment; See FIG. 6

Figure 6:
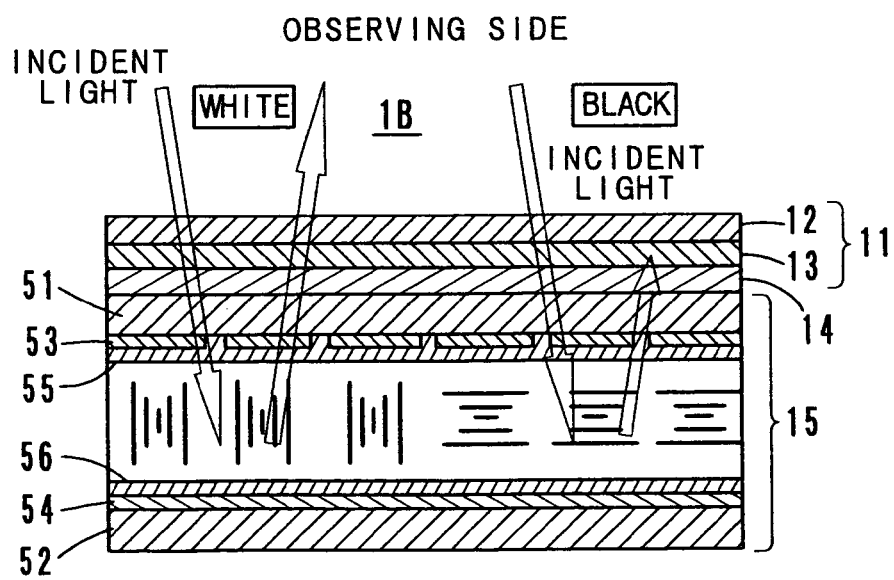
FIG. 6 is a sectional view of a reflective type liquid crystal display apparatus according to a second embodiment of the present invention.

FIG. 6 shows a liquid crystal display 1B according to a second embodiment of the present invention. The liquid crystal display 1B is basically of the structure of the liquid crystal display 1A according to the first embodiment of the present invention. The liquid crystal display 1B further comprises a scattering layer 14 between the circular polarizer 11 and the liquid crystal display 15.

Although the scattering layer 14 is not indispensable, it is provided to achieve a good white display. The scattering layer 14 is a transparent material with particles of different refractive indexes scattered therein. The scattering layer 14 may be a film or may be a sticky film. As the transparent material, polyeter sulfone (PES), polycarbonate (PC), triacetyl cellulose (TAC), etc. are usable. As the particles, spherical particles of acrylic resin, silica, etc. are usable. Also, it is possible to give a scattering function to a transparent plate by roughening a surface of the plate.

The scattering layer 14 scatters light incident thereto and light emergent therefrom appropriately and thereby eases the directivity of the electrodes 54 which serve as a reflector. Also, the scattering layer 14 does not cancel the polarization and does not lower the contrast. When the liquid crystal is in a focal-conic state, the light reflected by the electrodes 54 passes through the liquid crystal layer and is circularly polarized. At this time, the directivity of the reflected light (circularly polarized light) is eased, and a good white display (a display of paper white) can be achieved.

An important factor of the scattering layer 14 is haze. The haze can be adjusted by changing the diameters of the particles and the scattering density of the particles. In order to achieve good contrast between black and white, generally, the haze is desirably within a range from 10% to 85% and more desirably within a range from 30% to 70%.

The scattering layer is not necessarily provided as a separate layer. It is possible to provide the substrate 51 with a scattering function, and it is also possible to provide the electrodes 54, which also serve as a reflector, further with a scattering function by roughening the surfaces of the electrodes 54.

Third Embodiment; See FIGS. 7a and 7b

Figure 7A:
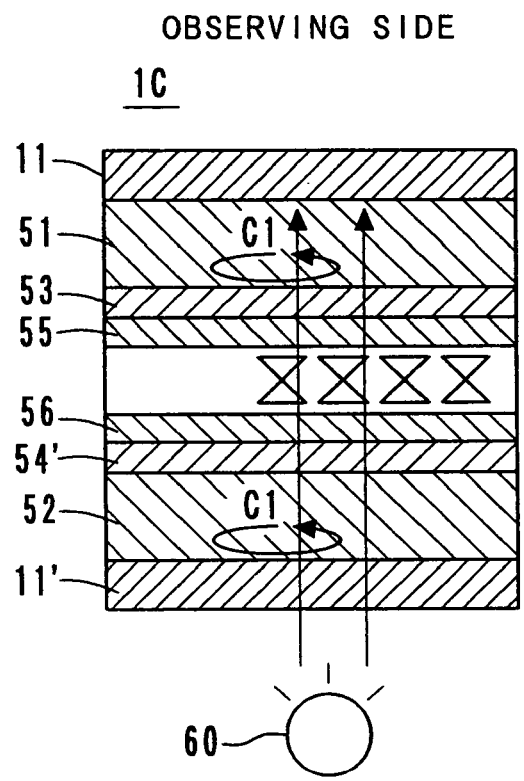
FIGS. 7a and 7b are sectional views of a transmitting type liquid crystal display apparatus according to a third embodiment of the present invention.
Figure 7B:
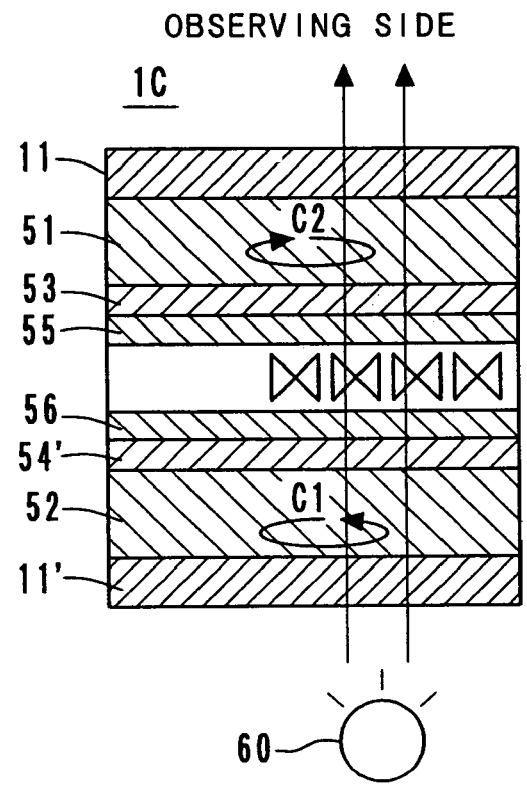

Although the above-described liquid crystal display apparatuses 1A and 1B are of a reflective type, the present invention is applicable to any liquid crystal display apparatus as long as it makes a display by controlling light emergent from a liquid crystal layer via a circular polarizer located by the observing side of the liquid crystal layer. For example, the present invention is also applicable to a light-transmitting type liquid crystal display apparatus which has a light source at the side opposite the observing side. FIGS. 7a and 7b show an example of this type of liquid crystal display apparatus.

Compared with the above-described liquid crystal display apparatus 1A, in the light-transmitting type liquid crystal display apparatus 1C, the lower electrodes are not reflective electrodes and are transparent electrodes 54', and a second circular polarizer 11' and a backlight 60 are further provided in the lowest section. The axes of polarization of the two circular polarizers 11 and 11' are orthogonal to each other. Light emitted from the backlight 60 is turned into circularly polarized light C1 by the circular polarizer 11' and is incident to the liquid crystal layer. As FIG. 7a shows, when the liquid crystal is in a planar state, the circularly polarized light C1 passes through the liquid crystal layer because the liquid crystal layer in a planar state has no birefringence effect. The circularly polarized light C1 which has passed through the liquid crystal layer is absorbed by the circular polarizer 11, of which axis of polarization is orthogonal to that of the circular polarizer 11'. Consequently, a black display is made.

On the other hand, as FIG. 7b shows, when the liquid crystal is in a focal-conic state, due to the birefringence effect of the liquid crystal layer, the circular polarized light C1 is turned into circular polarized light C2 and passes through the circular polarizer 11. Consequently, a bright (white) display is made. In this apparatus, the retardation of the liquid crystal layer is set to twice that of a reflective type apparatus, that is, set to $\lambda/2$. In order to set the retardation to twice that of a reflective type apparatus, the thickness of the liquid crystal layer should be set to twice that of the reflective type apparatus, or $\Delta n$ of the liquid crystal material should be set to twice that of the reflective type apparatus.

Driving Circuit; See FIG. 8

FIG. 8 shows the pixel structure of the liquid crystal display apparatuses 1A, 1B and 1C. In the structure, the pixels are in a matrix composed of a plurality of scanning electrodes R1, R2 . . . Rm and a plurality of signal electrodes C1, C2 . . . Cn (m, n: natural numbers). The scanning electrodes R1, R2 . . . Rm are connected to output terminals of a scanning electrode driving IC 131, and the signal electrodes C1, C2 . . . Cn are connected to output terminals of a signal electrode driving IC 132.

The scanning electrode driving IC 131 sends a selection signal to a specified one of the scanning electrodes R1, R2 . . . Rm while sending a non-selection signal to the other scanning electrodes. The scanning electrode driving IC 131 sends the selection signal to the scanning electrodes R1, R2 . . . Rm sequentially at specified time intervals. In the meantime, in order to perform writing on the pixels on the selected scanning electrode, the signal electrode driving IC 132 sends signals in accordance with image data to the signal electrodes C1, C2 . . . Cn concurrently. For example, while a scanning electrode Ra is selected (a: natural number, $a \leq m$), writing is carried out on the pixels LRa-C1 through LRa-Cn on the intersections between the scanning electrode Ra and the signal electrodes C1, C2 . . . Cn concurrently. The voltage difference between a scanning electrode and a signal electrode serves as a writing voltage for the pixel on the intersection between these electrodes. Each pixel is updated in accordance with the writing voltage.

Writing is performed while all the scanning lines are selected sequentially. When writing is to be performed on a part of the screen, only specified scanning electrodes including the part to be updated should be selected sequentially. Thereby, writing is performed only on a necessary part, and the time for writing is shortened. Since the liquid crystal display has a memory effect, a simple matrix driving method is possible even if the display has a large number of pixels. Thus, an active element, such as TFT, is not necessary, and a liquid crystal display apparatus with a high accuracy can be obtained at low cost.

A control section comprises a CPU 135 for controlling the whole apparatus, an LCD controller for controlling the driving ICs 131 and 132, an image processing device 137 and an image memory 138 to be stored with image data. The CPU 135 incorporates a ROM stored with a control program and various kinds of data and a RAM to be stored with various kinds of data.

Electric power is supplied from a power source 140 to the driving ICs 131 and 132. The LCD controller 136 controls the driving ICs 131 and 132 in accordance with image data stored in the image memory 138, and the driving ICs 131 and 132 apply voltages to the scanning electrodes and the signal electrodes of the liquid crystal display 15 to perform image writing.

Also, the CPU 135 takes in temperature data from a temperature sensor 139 provided near the liquid crystal display 15 and temporarily stores the temperature data in the RAM. What is stored in the ROM is information used for determination of the time length Tsp of a selection pulse application step, the time length Ts of a selection step and the voltage to be applied in each step, which will be described in detail later.

Basic Driving Wave; See FIG. 9

Figure 9:
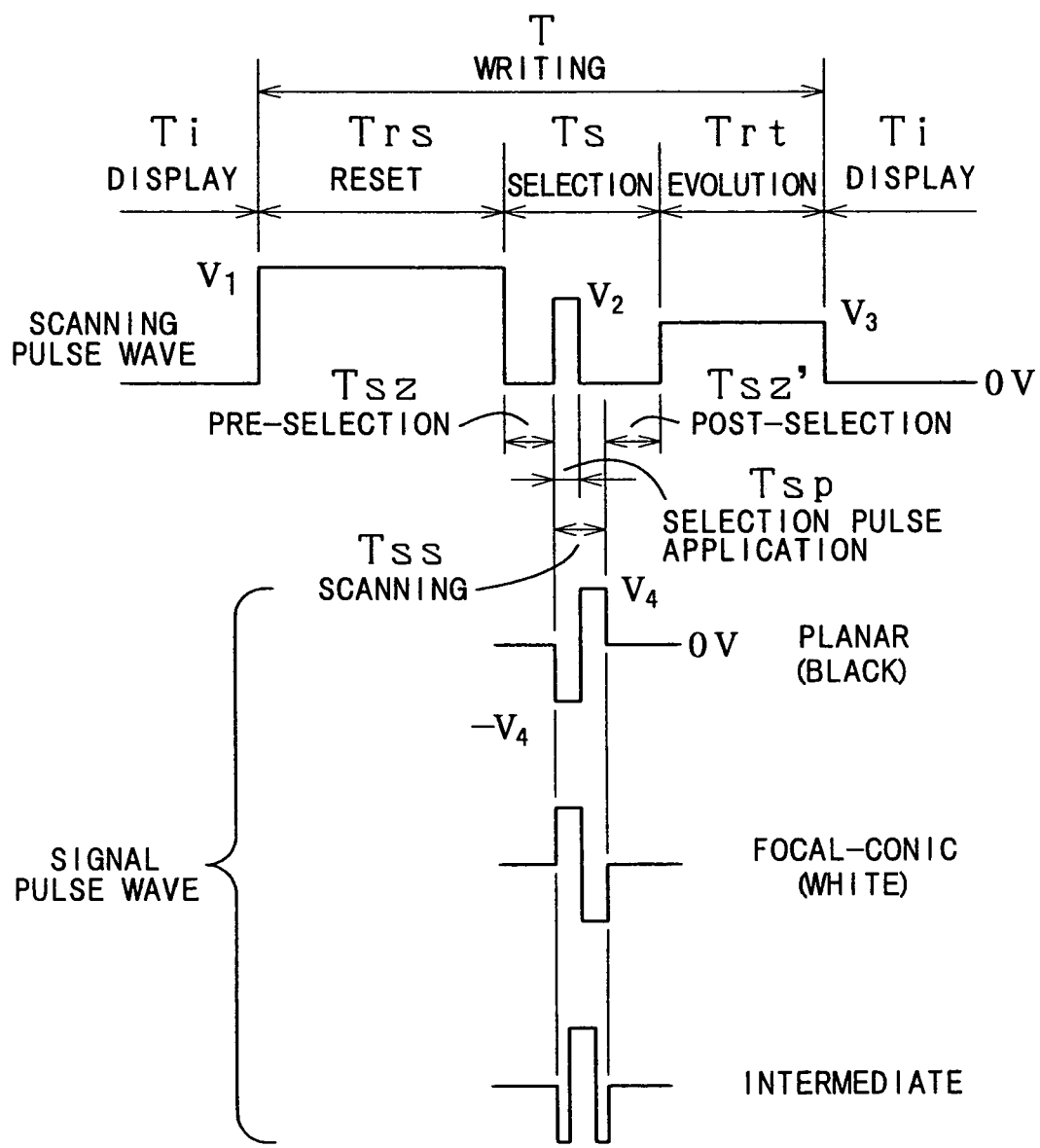
FIG. 9 is a chart which shows a driving pulse wave usable for the liquid crystal display apparatuses.

The principle of a method for driving the liquid crystal display 15 of the above-described structure is described. Although the basic driving wave shown in FIG. 9 is composed of a positive pulse wave generated by the scanning electrode driving IC and an alternating pulse wave generated by the signal electrode driving IC, the basic driving wave is not limited to this type. For example, the wave generated by the scanning electrode driving IC may be a negative wave, may be a wave switching between negative and positive (for example, for each frame) or an alternating wave. When a direct pulse voltage is applied to the liquid crystal, the power consumption is low, and when an alternating pulse voltage is applied to the liquid crystal, deterioration of the liquid crystal is prevented.

In FIG. 9, a scanning pulse wave is a basic driving wave output from the scanning electrode, driving IC 131 to each of the scanning electrodes, and a signal pulse wave is a driving wave output from the signal electrode driving IC 132 to each of the signal electrodes in accordance with image data. This driving method generally comprises a reset step Trs, a selection step Ts and an evolution step Trt, and the rest of time in which a display is kept is called a display step Ti (also referred to as a crosstalk step).

The selection step Ts comprises a selection pulse application step Tsp, a pre-selection step Tsz and a post-selection step Tsz'. The length of a scanning step Tss in which a signal pulse is applied is expressed by the following expressions:

$$Tss = Tsp \times 2$$

$$Tss = Ts - (Tsz + Tsz')$$

The scanning electrode driving IC 131 applies the following voltages to the selected scanning electrode in the respective steps. In the reset step Trs, a reset pulse of a voltage $V_1$ is applied. In the selection pulse application step Tsp of the selection step Ts, a selection pulse of a voltage $V_2$ is applied. In the pre-selection step Tsz and the post-selection step Tsz', 0 volt is applied. In the evolution step Trt, an evolution pulse of a voltage $V_3$ is applied. Meanwhile, the signal electrode driving IC 132 applies a signal pulse of a voltage $\pm V_4$ in accordance with image data in the scanning step Tss.

Thus, the scanning electrode driving IC 131 applies a chain of pulses composed of a plurality of kinds of pulses, namely a reset pulse, a selection pulse and an evolution pulse, and the signal electrode driving IC 132 applies a signal pulse. Preferably, the signal pulse is an alternating pulse of a voltage small enough not to cause crosstalk which gives bad influence to liquid crystal.

Next, the transition of the state of the liquid crystal is described. First, when the reset pulse of voltage V1 is applied in the reset step Trs, the liquid crystal is reset to a homeotropic state. Next, the liquid crystal is back in a slightly twisted state in the pre-selection step Tsz. Then, in the scanning step Tss, depending on the superimposition of the selection pulse and the signal pulse applied in this step, in each pixel, the final state of the, liquid crystal is determined, selected from a planar state (black display), a focal-conic state (white display) and an intermediate state (display of an intermediate tone).

First, a case of selecting a planar state is described. In this case, in the scanning step Tss, a pulse with a comparatively high energy resulting from superimposition of a selection pulse with a signal pulse is applied to the liquid crystal, whereby the liquid crystal comes to a homeotropic state again. Thereafter, in the post-selection step Tsz', the liquid crystal is twisted a little again. Then, when an evolution pulse of a voltage $V_3$ is applied in the evolution step Trt, the liquid crystal, which has been twisted a little in the post-selection step Tsz', is untwisted by the application of the evolution pulse and comes to a homeotropic state. Then, by setting the voltage applied to the liquid crystal to zero, the liquid crystal comes to a planar state and is stabilized in the planar state.

Thus, in a case of selecting a planar state, during a writing time, that is, from the start of the reset step to the end of the evolution step, the liquid crystal is substantially kept in a homeotropic state. While the liquid crystal is in a homeotropic state, the liquid crystal has an isotropic refractive index in the plane of the substrates, and the display made by the liquid crystal in a homeotropic state is the same as that made by the liquid crystal in a planar state. In the liquid crystal display according to the preferred embodiment of the present invention, as described above, a circular polarizer is provided in the observing side, and when the liquid crystal is in a planar state, the liquid crystal display makes a dark (black) display. Accordingly, during the writing time, a dark (black) display is seen.

On the other hand, in a case of selecting a focal-conic state, in the scanning step Tss, a pulse with an energy smaller than that in the case of selecting a planar state is applied. Than, in the post-selection step Tsz', the liquid crystal is twisted back to such an extent that the helical pitch of the liquid crystal is widened approximately double.

In the evolution step Trt, an evolution pulse of the voltage $V_3$ is applied. By the application of the evolution pulse, the liquid crystal, which has been twisted back, comes to a focal-conic state. Even if the voltage applied to the liquid crystal becomes zero, the liquid crystal in a focal-conic state stays in the same state.

Thus, in a case of selecting a focal-conic state, the liquid crystal is in a focal-conic state during a writing time except the evolution step. As described above, the liquid crystal display apparatus according to the present embodiment makes a bright (white) display when the liquid crystal is in a focal-conic state. Therefore, in this case, a bright (white) display is seen from the middle of the writing time.

As has been described, in either case of selecting a planar state or a focal-conic state, the display seen during a writing time is compatible with the display seen after the writing time, and blackouts can be inhibited. Also, in accordance with the energy of the selection pulse and the energy of the signal pulse applied in the scanning step Tss, the final display state of the liquid crystal is determined, and the pulse width of the selection pulse can be very short. Therefore, high-speed writing is possible. According to the driving wave shown in FIG. 9, the pulse waveform in the selection step is changed by changing the phase of the signal pulse, and thereby, the selection of the state of liquid crystal is made. With this arrangement, it is possible to use a simple IC with a small number of kinds of output terminals as the signal driving IC. However, the voltage of the signal pulse may be changed, and both the phase and the voltage of the signal pulse may be changed.

Experiment; See FIG. 5

A liquid crystal display apparatus 1A shown in FIG. 5, which was made of the following materials, was used for a driving experiment. A substrate 51 in the observing side was a glass substrate with a thickness of 0.7 mm, and electrodes 53 were formed of ITO with a resistance of 10 Ω/□. A substrate in the back side was a glass substrate with a thickness of 0.7 mm, and electrodes 54 with a thickness of 60 nm were formed of Aluminium. These electrodes 54 also serve as a reflector. The ITO electrodes 53 and the Aluminium electrodes 54 were formed by forming an ITO film and an Aluminium film on the respective glass substrates by sputtering and by forming electrode patterns by photolithography. On the electrode-sides of the substrates, 51 and 52, a horizontal aligning material AL 8044 made by JSR, Co. Ltd. was printed to have a thickness of 800 Å by flexography as aligning layers 55 and 56.

With respect to liquid crystal, nematic liquid crystal and a chiral agent were mixed together so that the resulting liquid crystal would exhibit a cholesteric phase at room temperature. The liquid crystal had the following properties: anisotropy of refractive index $\Delta n=0.045$ (refractive index in direction of ordinary rays no=1.5378, refractive index in direction of extraordinary rays ne=1.4928); anisotropy of dielectric constant $\Delta \epsilon=16$; wavelength to be selectively reflected=470 nm; helical pitch P=470/1.5378=305 nm; and having a helical structure to selectively reflect clockwise polarized light.

The thickness of the liquid crystal layer (the gap between the substrates) was approximately 3 μm, and Micropearl SP-203 made by Sekisui Finechemical, Co., Ltd. was used as the gap controlling material. Accordingly, the retardation $\Delta$nd of the liquid crystal display was 135 nm. Also, in order to seal the liquid crystal in the gap between the substrates 51 and 52, Sumilight ERS-2400 made by Sumitomo Bakelight Co., Ltd. was used as the main agent, and ERS made by Sumitomo Bakelite Co., Ltd. was used as a hardening agent.

As a circular polarizer 11 (a linear polarizer 12 and a retardation plate 13), EG1425DU (made by Nitto Denko Co., Ltd.) was used as the linear polarizer 12, and R-140 (PC1 elastic film made by Nitto Denko Co., Ltd.) was used as the retardation plate 13. These elements were arranged such that light which has passed therethough would be counterclockwise polarised light (not to be selectively reflected by the cholesteric liquid crystal) and that the angle of the absorbing axis of the linear polarizer to the retardation axis of the retardation plate would be 45 degrees.

Dependency of Display Performance on Reset Voltage

By use of the liquid crystal display apparatus 1A, a driving experiment was conducted. The reset voltage $V_1$ was changed while the time lengths of the steps and the evolution voltage $V_3$ under temperature of 25° C. were set as follows: the length of the reset step Trs was 24 ms; the length of the selection step was 0.65 ms (the length of the pre-selection step Tsz was 0.215 ms, the length of the selection pulse application step Tsp was 0.11 ms, and the length of the post-selection step Tsz' was 0.325 ms); the length of the evolution step Trt is 13 ms; and the evolution voltage $V_3$ was 26V.

In this experiment, for simplification of the measurement, the voltages applied to the signal electrodes were kept 0V during all the steps, and the voltages of the scanning pulses applied to the scanning electrodes were changed. In other words, the waveform of the scanning pulse corresponds to the waveform of the pulse applied to the liquid crystal. Here, the selection pulse voltage was 24V so as to select a planar state. The results are shown in Table 1 and FIG. 10.

TABLE 1

| Reset Voltage | Black Display, Y Value |
| --- | --- |
| 80 V | 9.8 |
| 60 V | 10.02 |
| 40 V | 10.5 |
| 36 V | 11.05 |
| 35 V | 11.8 |
| 34 V | 12.8 |
| 33 V | 13.5 |

Figure 10:
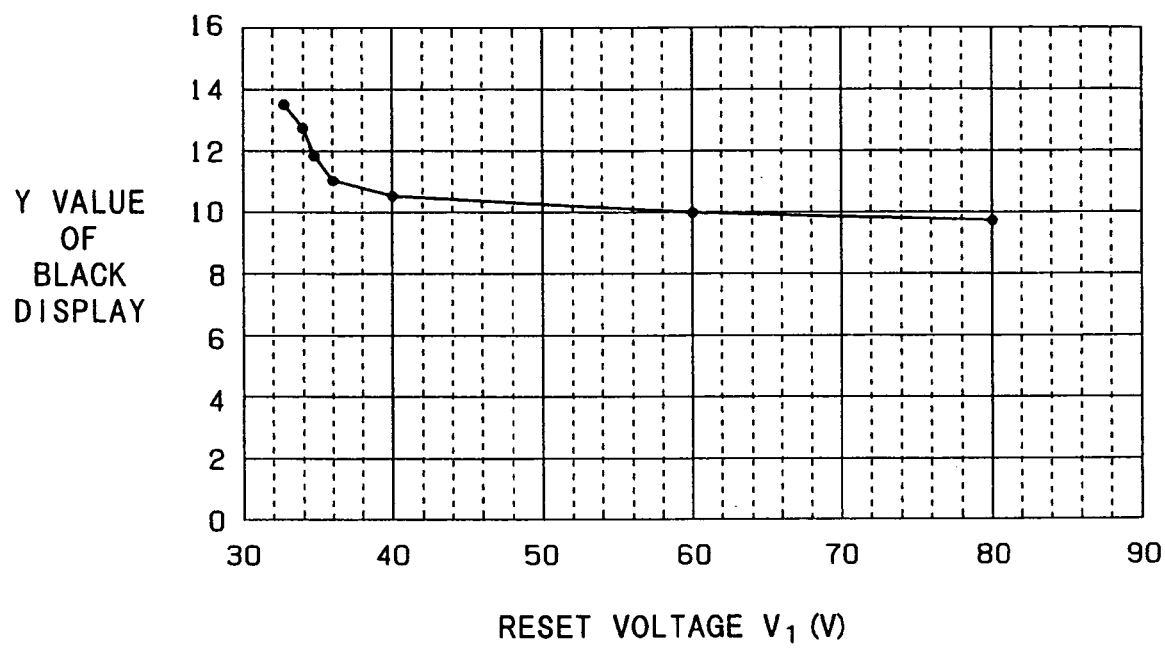
FIG. 10 is a graph which shows the relationship between reset voltage and Y value of a black display in an experiment.

As is apparent from Table 1 and FIG. 10, at the point where the reset voltage $V_1$ applied to the liquid crystal becomes over 35V, the black display performance improves (the Y value is lowered), and an improvement in contrast was seen. The reason why with a rise in reset voltage $V_1$, the Y value of the black display is lowered, resulting in an improvement in contrast is inferred that with a rise in reset voltage $V_1$, the liquid crystal molecules in a homeotropic state easily stand perpendicularly to the aligning layer, resulting in alignment of the helical axes in a planar state and in almost no phase difference in a planar state. Also, the fact that with a rise in reset voltage $V_1$, a smaller quantity of reflected light passes through the circular polarizer 11 may influence the fall in Y value of a black display.

Dependency of Reset Performance on Reset Voltage

Figure 11:
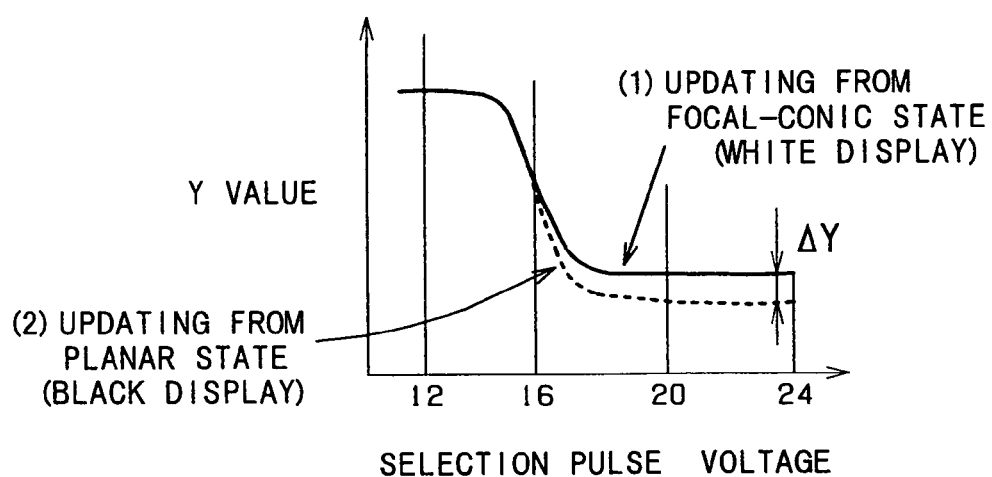
FIG. 11 is a graph which shows the relationship between selection pulse voltage and Y value in an experiment.

In the liquid crystal display apparatus 1A, the time lengths of the steps and the evolution voltage $V_3$ under temperature of 25° C. were set as follows: the length of the reset step Trs was 24 ms; the length of the selection step was 0.65 ms (the length of the pre-selection step Tsz was 0.215 ms, the length of the selection pulse application step Tsp was 0.11 ms, and the length of the post-selection step Tsz was 0.325 ms); the length of the evolution step Trt is 13 ms; and the evolution voltage $V_3$ was 25V. By use of the liquid crystal display apparatus 1A, another driving experiment was conducted while varying the reset voltage $V_1$. In each case of the variable reset voltages, as shown by FIG. 11, a characteristic indicating the relationship between the Y value and the selection pulse voltage (Y value-selection pulse characteristic) was obtained. The characteristic curve shown by FIG. 11 was obtained as follows: by applying the above-described driving wave to the liquid crystal in a planar state or a focal-conic state at a plurality of times while keeping a constant reset voltage and varying the selection pulse voltage; and by measuring the Y value of the liquid crystal after each time of application of the driving wave.

The results are shown in Table 2. In Table 2, $\Delta Y$ indicates the difference (the maximum difference) in Y value between the Y value-selection pulse voltage characteristic curve of the liquid crystal in a focal-conic state (1) and that of the liquid crystal display in a planar state (2). In measuring the Y value, the reflectance was measured by use of a spectral calorimeter CM3700 made by Konica Minolta Co., Ltd., and the Y value was calculated. In the experiments, calculations of all the Y values were based on the measurements of Y values by use of the spectral calorimeter CM3700.

TABLE 2

| Reset Voltage | $\Delta Y$ | Reset |
| --- | --- | --- |
| 33 V or higher | 0 | Possible |
| 32 V | 0.3 | Bad-Conditioned |

TABLE 2-continued

| Reset Voltage | ΔY | Reset |
|---|---|---|
| 31 V | 0.9 | Impossible |
| 30 V | 2.5 | Impossible |

When the reset voltage is 33V or higher, the Y value of a white display is 25, and the Y value of a black display is 1. In this case, accordingly, as shown in Table 2, ΔY is zero. However, when the reset voltage is 32V or lower, ΔY is more than zero, and the reset is bad-conditioned. The smaller the reset voltage is, the larger the difference between the characteristic curve (1) and the characteristic curve (2) is. Accordingly, ΔY becomes larger, and it becomes impossible to perform a reset step.

As is apparent from Table 2, according to the results of the experiment, the reset voltage $V_1$ which did not cause a bad condition of a reset step was 33V or higher. When the reset voltage $V_1$ was within a range from 33V to 35V, the Y value of a black display was high, and the contrast was low compared with a case in which the reset voltage $V_1$ was higher than 35V. However, a normal display could be achieved.

Thus, the reset voltage has a lower limit not to cause a bad condition of a reset step and a threshold with respect to black display performance. The lower limit and the threshold depend on the thickness of a liquid crystal layer and the properties (anisotropy of dielectric constant, coefficient of elasticity, wavelength to be selectively reflected by the liquid crystal, helical pitch, etc.) of the liquid crystal. As has been described, however, the thickness of the liquid crystal layer is practically limited within a specified range from the viewpoint of manufacturing and from the viewpoint of selection of liquid crystal materials.

The liquid crystal material must have anisotropy of refractive index with retardation which is required as a liquid crystal display. Determination of the anisotropy of refractive index naturally determines the anisotropy of dielectric constant and coefficient of elasticity, which are parameters in strong correlation with the anisotropy-of refractive index.

The helical pitch and the wavelength to be selectively reflected by the liquid crystal depend on the kind and the amount of a chiral agent added. If the helical pitch and the wavelength to be selectively reflected by the liquid crystal are too large, it may take a longer time for writing, and the liquid crystal in a planar state may be colored. If the helical pitch and the wavelength to be selectively reflected by the liquid crystal are too small, the operating temperature range becomes narrow. Therefore, it is impossible to change these parameters largely. Thus, considering the characteristics of the liquid crystal display apparatus, the properties of the liquid crystal materials cannot be changed largely.

The present inventors examined the display performance while varying the materials and the thickness of the liquid crystal. According to the experiment, as long as the reset voltage was kept not less than 30V, normal display was possible, and as long as the reset voltage was higher than 45V, the black display performance was improved. Therefore, if a high grade of black display is required, the reset voltage should be set higher than 45V. If a low driving voltage rather than a high grade of black display is required, the reset voltage should be set within a range from 30V to 45V. In the former case, the Y value of a black display can be closer to a saturated value by setting the reset voltage desirably 50V or higher and more desirably 55V or higher. In the latter case, securer prevention of a display failure and use of more inexpensive ICs become possible by setting the reset voltage desirably within a range from 32V to 40V and more desirably within a range from 33V to 35V.

As has been mentioned, it is not possible to change the properties of the liquid crystal material. From the experiments conducted by the inventors, it was found out that if the thickness of the liquid crystal layer was d(μm), desirable display performance could be achieved by setting the reset voltage as follows: setting the reset voltage to 10.7 d(V) or higher so as to achieve a normal display; setting the reset voltage to 12.7 d(V) or higher so as to achieve a black display of a sufficiently high grade; and setting the reset voltage within a range from 10.7 d(V) to 12.7 d(V) so as to achieve a normal display by a low driving voltage. More desirably, the reset voltage should be set to 11 d(V) or higher so as to achieve a normal display, set to 13 d(V) or higher so as to achieve a black display of a sufficiently high grade and set within a range from 11 d(V) to 12 d(V) so as to achieve a normal display by a low driving voltage.

Dependency of Display Performance on Evolution Voltage

Next, in the liquid crystal display apparatus 1A, the time lengths of the steps and the reset voltage $V_1$ under temperature of 25° C. were set as follows: the length of the reset step Trs was 24 ms; the reset voltage $V_1$ was 40 V; the length of the selection step Ts was 0.65 ms (the length of the pre-selection step Tsz was 0.215 ms, the length of the selection pulse application step Tsp was 0.11 ms, and the length of the post-selection step Tsz' was 0.325 ms); and the length of the evolution step Trt is 13 ms. By use of the liquid crystal display apparatus 1A, another driving experiment was conducted while varying the evolution voltage $V_3$. The results are shown in table 3. Further, in each case of varying the selection pulse voltages within a range from 8V to 24V, a Y value-selection pulse voltage characteristic as shown by FIG. 11 was obtained.

TABLE 3

| Upper Limit of the Evolution Voltage | 27.0 V |
|---|---|
| Optimal Value of the Evolution Voltage | 25.0 V |
| Lower Limit of the Evolution Voltage | 23.5 V |

In the Experiment, as shown in Table. 3, when the evolution voltage was 27V or higher, the Y value of a white display became lower, and in addition, γ became larger (the maximum γ was over 8V). Here, γ is the difference between the voltage permitting 95% of the saturated reflectance and the voltage permitting 5% of the saturated reflectance referring to a γ characteristic curve which shows the relationship between the selection pulse voltage and the reflectance. It is preferred that γ is not more than 8V. Also, when the evolution voltage $V_3$ was 23.5V or lower, the Y value of a black display became higher, and γ became larger (the maximum γ was over 8V). The optimal evolution voltage was 25V.

Thus, there are an upper limit and a lower limit of the evolution voltage. The upper limit and the lower limit of the evolution voltage depend on the thickness of the liquid crystal layer and the properties of the liquid crystal material. From the experiments of the inventors, it was found out that the contrast and γ could be kept in an appropriate, extent as long as the evolution voltage was within a range from 20V to 30V. The evolution voltage is set desirably within a range from 22V to 28V and more desirably within a range from 23 V to 27V. It was also found out that the contrast and γ could be kept in an appropriate extent as long as the evolution voltage was within a range from 7.2 d(V) to 9.7 d(V), wherein d is the thickness (μm) of the liquid crystal layer. The evolution voltage is set desirably within a range from 7.5 d(V) to 9.5 d(V) and more desirably within a range from 7.8 d(V) to 9 d(V).

Display State During Writing

While the liquid crystal display apparatus 1A was subjected to the same conditions as in the above-described experiments under temperature of 25° C., the display state in a writing time was examined. While the reset voltage $V_1$ and the evolution voltage $V_3$ were kept at respectively 40V and 25V, the selection pulse voltage was varied. As a result, compared with a liquid crystal display apparatus which comprises a cholesteric liquid crystal layer without a polarizer, in the liquid crystal display apparatus 1A, blackouts during writing were inhibited.

Figure 12:
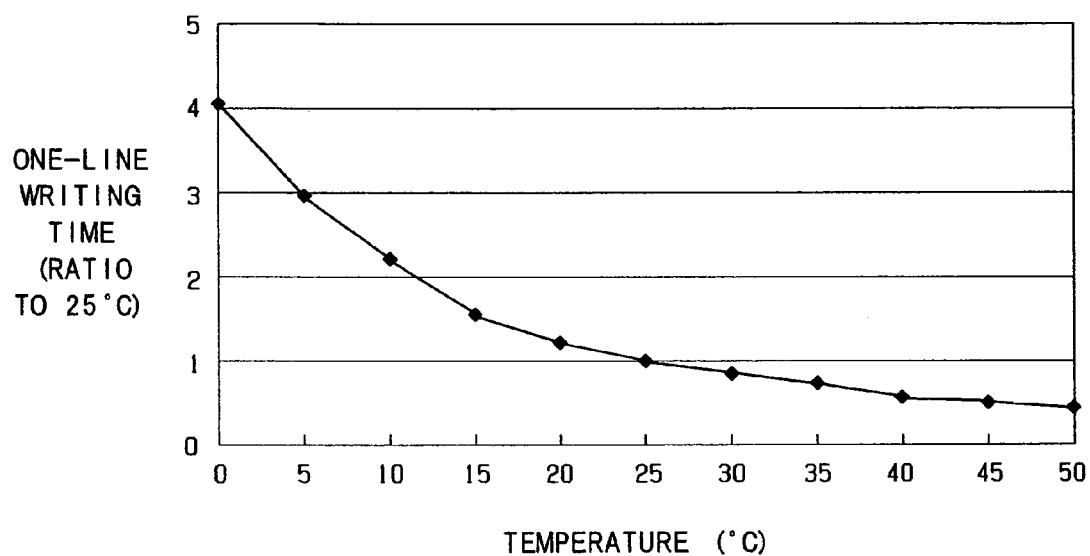
FIG. 12 is a graph which shows the temperature dependency with regard to one-line writing time.

Temperature Dependency of One-line Writing Time,

Now referring to FIG. 12, the temperature dependency of the one-line writing time are described from the above-described experiments.

A one-line writing time is the total time of the length of the reset step Trs, the length of the selection step Ts and the length of the evolution step Trt. According to the driving experiments conducted by the inventors, by changing the one-line writing time in accordance with temperature as shown by FIG. 12, a desirable display state could be kept at any temperature. In the case of FIG. 12, the one-line writing time is changed based on the ratio to the one-line writing time under 25° C. In order to implement the writing time control to comply with the temperature dependency, for example, the LCD controller 136 changes the total length of a chain of pulses with changes in circumstantial temperature while keeping the ratios of the pulse widths of the respective pulses to one another.

Driving Voltage of a Transmitting Type Liquid Crystal Display

In a case of using a transmitting type liquid crystal display, the retardation must be twice that of a reflective type liquid crystal display. Accordingly, if liquid crystal with the same extent of anisotropy of refractive index Δn as that of the reflective type liquid crystal layer, the thickness of the liquid crystal layer must be twice that of a reflective type liquid crystal display. Therefore, under temperature of 25° C., by setting the reset voltage $V_1$ to 90V or higher, high contrast can be achieved, and by setting the reset voltage $V_1$ within a range from 60V to 90V, a normal display can be achieved by a low driving voltage. Alternatively, by changing the anisotropy of refractive index Δn, the retardation can be regulated. In this case, under temperature of 25° C., by setting the reset voltage $V_1$ to 4.05/Δn or higher, high contrast can be achieved, and by setting the reset voltage $V_1$ within a range from 2.7/Δn(V) to 4.05/Δn(V), a normal display can be achieved by a low driving voltage. Also with respect to the evolution voltage $V_3$, in a case of using a transmitting type liquid crystal display apparatus with the same extent of anisotropy of refractive index Δn as that of the reflective type liquid crystal layer, under temperature of 25° C., by setting the evolution voltage $V_3$ within a range from 40V to 60V, a normal display can be achieved by a low driving voltage.

If the thickness of the liquid crystal layer is d(μm), by setting the: reset voltage $V_1$ within a range from 10 d(V) to 15 d(V) or within a range from 0.45 d/Δn(V) to 0.675/Δn(V), a normal display can be achieved by a low driving voltage.

Also, by setting the reset voltage $V_1$ to 15 d(V) or higher or to 0.675 d/Δn(V) or higher, an improvement in black display is possible. Moreover, by setting the evolution voltage $V_3$ within a range from 6.7 d(V) to 10 d(V) or within a range from 0.3 d/Δn(V) to 0.45 d/Δn(V), the contrast and γ can be kept in an appropriate extent. Further, when signal pulses lower than a threshold to cause crosstalk is applied to the signal electrodes, the signal pulses are superimposed in the reset step and in the evolution step. However, because the signal pulses are less than the threshold, the signal pulses substantially make no influences. Accordingly, in this case, the scanning pulse voltages before superimposition should be set to the above-described values.

Other Embodiments

The composition and the properties of the cholestric liquid crystal may be arbitrarily determined. Although the method for driving the liquid crystal is based on a three-step driving method including a reset step, a selection step and an evolution step, the voltages of the respective pulses and the time lengths of the respective steps may be set to other values as well as the values described in the above embodiments.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A liquid crystal display apparatus comprising:
a cholesteric liquid crystal layer which switches between a planar alignment state and a focal-conic alignment state depending on a voltage applied thereto;
a polarizer which is located by an observing side of the cholesteric liquid crystal layer; and
a driving section which outputs a chain of voltage pulses including a reset step of resetting the cholesteric liquid crystal to a homeotropic state, a selection step of selecting an alignment state of the liquid crystal under zero-volt application and an evolution step of causing the liquid crystal to evolve to the selected alignment state.

2. A liquid crystal display apparatus according to claim 1, further comprising a reflector so that the liquid crystal display apparatus can be of a reflective type.

3. A liquid crystal display apparatus according to claim 2, further comprising substrates which sandwich the cholesteric liquid crystal layer,
wherein the reflector is located behind the substrate which is located farther from the observing side.

4. A liquid crystal display apparatus according to claim 2, wherein under a circumstantial temperature of at least 25° C., the voltage applied to the liquid crystal in the reset step is substantially within a range from 30V to 45V.

5. A liquid crystal display apparatus according to claim 2, wherein under a circumstantial temperature of at least 25° C., the voltage applied to the liquid crystal in the reset step is substantially over 45V.

6. A liquid crystal display apparatus according to claim 2, wherein under a circumstantial temperature of at least 25° C., the voltage applied to the liquid crystal in the evolution step is substantially within a range from 20V to 30V.

7. A liquid crystal display apparatus according to claim 2, wherein under a circumstantial temperature of at least 25°

C., the voltage applied to the liquid crystal in the reset step is substantially within a range from 10.7 d(V) to 12.7 d(V), wherein d is a thickness (μm) of the liquid crystal layer.

8. A liquid crystal display apparatus according to claim 2, wherein under a circumstantial temperature of at least 25° C., the voltage applied to the liquid crystal in the reset step is substantially over 12.7 d(V), wherein d is a thickness (μm) of the liquid crystal layer.

9. A liquid crystal display apparatus according to claim 2, wherein under a circumstantial temperature of at least 25° C., the voltage applied to the liquid crystal in the evolution step is substantially within a range from 7.2 d(V) to 9.7 d(V), wherein d is a thickness (μm) of the liquid crystal layer.

10. A liquid crystal display apparatus according to claim 2, wherein under a circumstantial temperature of at least 25° C., the voltage applied to the liquid crystal in the reset step is substantially over 12.7 d(V), and the voltage applied to the liquid crystal in the evolution step is substantially within a range from 7.2 d(V) to 9.7 d(V), wherein d is a thickness (μm) of the liquid crystal layer.

11. A liquid crystal display apparatus according to claim 1, further comprising electrodes which sandwich the cholesteric liquid crystal layer,
wherein the electrode which is located farther from the observing side also serves as a reflector.

12. A liquid crystal display apparatus according to claim 1, further comprising a second polarizer and a light source which are located by a rear side of the liquid crystal layer so that the liquid crystal display apparatus can be of a transmitting type.

13. A liquid crystal display apparatus according to claim 1, further comprising scanning electrodes and signal electrodes which face each other with the liquid crystal layer in-between,
wherein the driving section comprises a scanning electrode driving circuit for applying a reset pulse in the reset step, a selection pulse in the selection step and an evolution pulse in the evolution step to the scanning electrodes, and a signal electrode driving circuit for applying a signal pulse, which is of a voltage lower than a threshold to cause crosstalk in the selection step, to the signal electrodes.

14. A liquid crystal display apparatus according to claim 13, wherein at least the voltage of the reset pulse applied to the scanning electrodes is constant regardless of the circumstantial temperature.

15. A liquid crystal display apparatus according to claim 13, wherein at least the voltage of the evolution pulse applied to the scanning electrodes is constant regardless of the circumstantial temperature.

* * * * *